United States Patent [19]
Olson

[11] Patent Number: 5,930,943
[45] Date of Patent: Aug. 3, 1999

[54] TRAP STAND IMPROVEMENTS

[76] Inventor: Thomas L. Olson, 1720 Quinlan Ave. South, Lakeland, Minn. 55043

[21] Appl. No.: 08/872,533

[22] Filed: Jun. 11, 1997

[51] Int. Cl.⁶ .................................................. A01M 23/24
[52] U.S. Cl. .................................................. 43/96
[58] Field of Search .................................. 43/91, 88, 96; 248/124.1, 125.1, 157, 127, 156, 419, 420, 99, 95, 448

[56] References Cited

U.S. PATENT DOCUMENTS

| | | | |
|---|---|---|---|
| 2,408,593 | 10/1946 | Barber | 43/89 |
| 4,152,861 | 5/1979 | Miller | 43/88 |
| 4,411,091 | 10/1983 | Hedstrom et al. | 43/88 |
| 4,492,056 | 1/1985 | Reasland | 43/96 |
| 4,517,762 | 5/1985 | Venetz | 43/96 |
| 4,720,934 | 1/1988 | Gompers | 43/89 |

*Primary Examiner*—Jack W. Lavinder
*Attorney, Agent, or Firm*—Nawrocki, Rooney & Sivertson, P.A.

[57] ABSTRACT

This invention for trap stands having a pair of supporting legs spaced apart by cross-members for body grip traps provides an improvement by providing extensions which project beyond the legs to provide height adjustment. Sleeves attached to the extensions are sized to slideably enclose each leg. The sleeves have provisions for securing them to the legs to secure the extensions in place. Another height adjustment improvement adds sleeves to the free end of each leg which slideably enclose each extension and provide additional support and stability for the extensions. Another improvement to trap stands separates each cross-member into two opposed overlapped parts. Sleeves, which slideably enclose opposite cross-member parts, are attached at the free end of each cross-member part for width adjustment. Sleeves attached to one of the legs have provisions for securing the sleeves to the opposite enclosed cross-member parts which secures the width adjustment.

2 Claims, 2 Drawing Sheets

TRAP STAND IMPROVEMENTS

BACKGROUND OF THE INVENTION

1. Field of the Invention

This invention relates to improved trap stands, in particular trap stands which position and secure body grip traps.

2. Description of the Prior Art

A typical body grip trap grips an animal within a pair of pivotally mounted rectangular frames. Springs yieldably bias the frames from a set position, where the frames are essentially aligned with each other, to a sprung position, where the frames are rotated towards a right angles alignment to close the opening through the aligned frames. A trigger positioned within the aligned frames is disturbed by an animal entering the frames. The frames, driven by the springs, then rotate rapidly towards the sprung orientation before the animal can move to grip the animal between the closing frames.

Since the animal must enter the aligned frames in order to be trapped, the orientation and vertical position of the trap is critical. A stand adapted to grip a body grip trap should provide a desired orientation and an optimal vertical position. Present stands use a pair of legs of a predetermined length for securing the trap in the desired orientation, usually with the aligned frames oriented vertically, with the length of the legs inserted into the surface establishing the trap height.

Often the trap is located near or on the surface of a pond or stream with the stand securing the trap to the pond or stream bottom. Presently stands must have different length legs to position the trap at various heights above the mounting surface, and a different size stand must be used for different size traps.

It would be desirable if existing or modified stands could be adjusted to secure traps at different heights above the supporting surface, and/or if a stand could modified to be adjusted for use with different size traps.

SUMMARY OF THE INVENTION

The present invention provides improvements to either existing or improvements to modified body grip trap stands to permit the stands to be adjusted easily in the field to a variety of heights above a mounting surface. Existing stands are supported by two legs extending downward from the trap into the earth. The legs are separated and supported at a given distance from each other by cross-bars which extend generally perpendicularly between the two. The preferred height adjustment apparatus provides extensions with attached sleeves which slideably engage the legs. The extensions overlap the leg with the distal end of the extension projecting distally beyond the downward extended distal end of the leg. Each sleeve has a securing arrangement to attach the extension at a fixed location with respect to the leg, which can be released to slideably adjust the distal projection of the extension end beyond the distal end of the leg, which can then resecure the extension to the leg. This permits the user to readily field adjust the amount that the extension projects distally beyond each leg to change the height of the trap above the mounting surface. These extensions can be used with existing stands to provide height adjustments. Another embodiment of the improvements is a modification to the stand which also provides each leg with an attached sleeve to slideably engage the extension and give additional stability and strength.

Here stands are also provided with an improvement which provides width adjustment to permit changing the spacing between the legs in the field to allow one stand to be used with a variety of different size traps.

A width adjustment is provided dividing the cross-bar into two separate and overlapped first and second opposed cross-bar parts to space the legs apart. These opposed cross-bar parts replace the single fixed cross-bars currently in use. These overlapped cross-bars parts have sleeves attached near their free ends which are sized and arranged to slideably engage the opposite part. These sleeves slideably orient the two cross-bar parts with respect to each other which extends the legs generally perpendicular to the cross-bar parts and parallel to each other. The sleeves attached to the cross-bar first parts also have securing means which attach the overlapped parts together. This arrangement permits adjusting the distance between the stand legs to accommodate different size traps in a manner similar to the height adjustment. The amount of cross-bar overlap is made adequate to permit adjusting the width of the stands over the available range of trap sizes. This allows one width adjustable stand to be used with any size trap.

This combination of height and width adjustment improvements provides a complete range of both trap height and trap size adjustment which can readily be accomplished in the field.

DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE INVENTION

Figure 1:
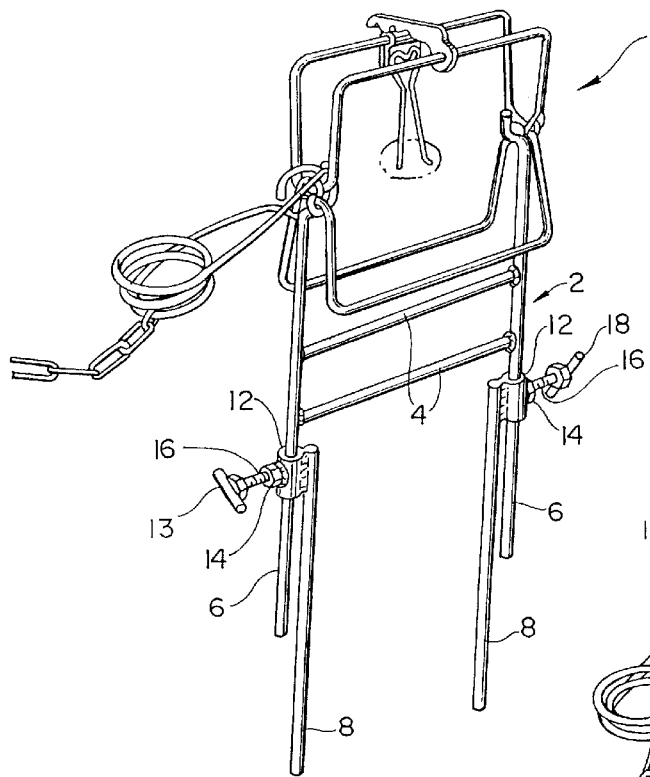
FIG. 1 shows extensions mounted upon an existing trap stand arranged to support a body grip trap.

Referring to FIG. 1 of the drawings a body gripping trap 1 is shown supported by a representative existing stand 2, having a bent portion 10 at the distal end of each support leg 6 for engaging and supporting the body trap. The two legs 6 which support the trap are spaced apart by generally perpendicular cross-members 4 extending therebetween. Extensions 8 provide a means for changing the effective lengths of legs 6.

Extension 8 has attached sleeves 12 formed from open sections of pipe and sized to slideably fit over legs 6. Sleeves 12 are attached to extensions 8 such that the axes and one end of each are aligned. Nuts 14 are attached to the surface of sleeves 12 on the side generally opposite their respective attached extensions 8. Bolts 16 are sized and threaded to mate with nuts 14. Holes through sleeves 12, not shown, the same size as the threaded holes through nuts 14, are located adjacent to each nut centered upon the threaded hole through each nut. The holes through sleeves 12 permit the ends of bolts 16 to extend into the sleeves and secure enclosed legs 6 in place. Handles 18 attached to and across the heads of bolts 6 permit rotating the bolts by hand to secure or release the legs.

In use, bolts 16 are rotated by hand using handles 18 until the bolt ends are withdrawn from within the respective attached sleeves 12. Sleeves 12 are then placed over legs 6, as shown in FIG. 1, and extensions 8 then positioned until the desired leg extensions are obtained. Bolts 16 are then tightened manually, using respective handles 18, until legs 6 within the respective sleeves 12 are gripped tightly by the bolts. This provides a simple means for adjusting and securing the heights of existing stands 2 with no modifications to the stands being required.

Figure 2:
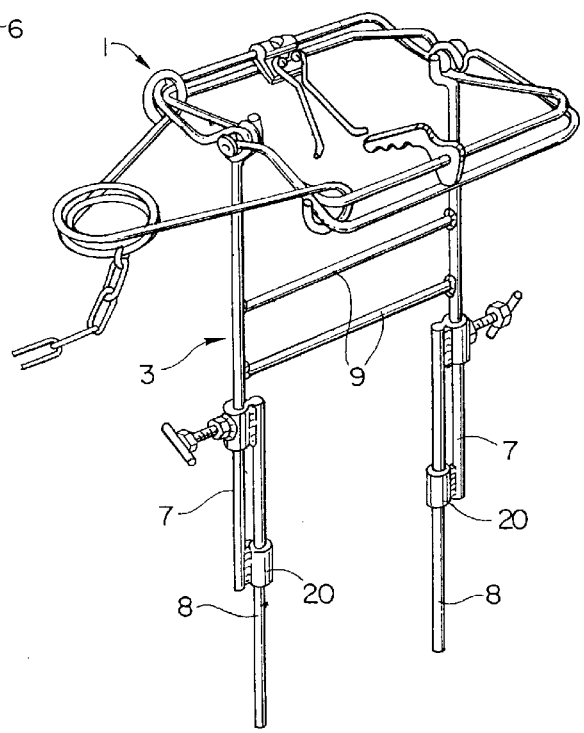
FIG. 2 shows extensions mounted upon a modified trap stand providing additional support for the extensions.

FIG. 2 shows a stand 3 which has been modified to assist in securing extension 8. Legs 7 of stand 3 are spaced apart a fixed distance by perpendicular fixed cross-members 9. Here each leg 7 of stand 3 has a sleeve 20 attached. Sleeves 20 are also formed from open sections of pipe, and here are sized such as to slideably fit over extensions 8. Each sleeve 20 is attached completely overlapping an end of its respective leg 7 with the axes of the attached sleeve and leg aligned.

Extensions 8 are made the same using the same parts, designated by the same part numbers, and operated in the same manner as described above for FIG. 1, excepting that here sleeves 12 are sized to slideably fit over legs 7.

The parts are attached such that when extensions 8 are positioned with sleeves 12 of the extensions over the respective legs 7 of stand 3, sleeves 20 attached respectively to legs 7 of the stand, will also be positioned over the respective extensions 8.

Extensions 8 are adjusted with respect to legs 7 the same as described earlier, however here sleeves 12 attached to extension 8 slideably attach the extension to the legs at the top end of the extension, while sleeves 20 attached to the legs slideably attach extensions at the bottom ends of the legs. The use of two such sets of sleeves 12 and 20, which brace each end of the overlaps of extensions 8 with legs 7, adds strength and stability to the prior arrangement.

In use, with this arrangement handles 18 are again turned to retract bolts 16 from sleeves 12 and extensions 8 are positioned where desired with respect to legs 7. Bolts 16 are then tightened using handles 18 to force the bolt ends against the respective legs 7 to secure extensions 8 in place with respect to legs 7. This arrangement also provides the same simple means for adjusting and securing the heights of modified stands 3.

Figure 3:
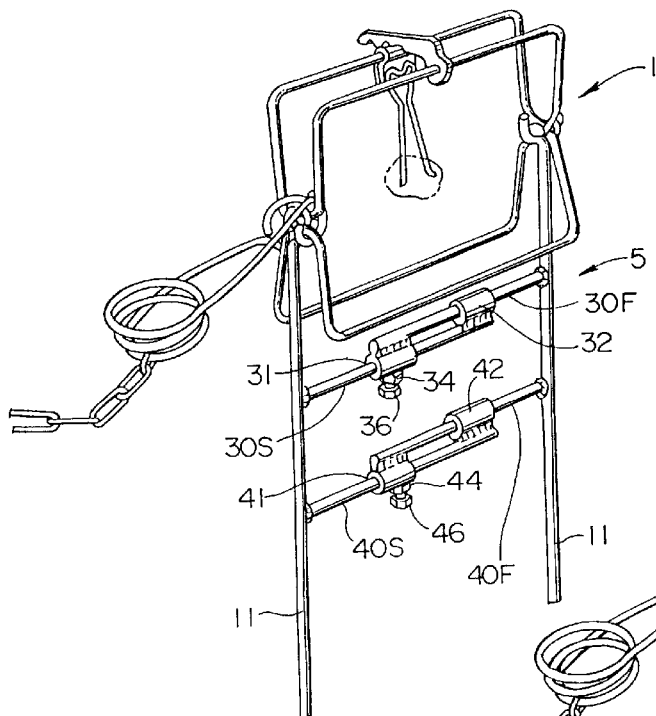
FIG. 3 shows a trap stand modified to permit adjusting the leg spacing.

FIG. 3 shows a modified stand 5 which can be adjusted to support different size traps 1. Legs 11 of stand 5 are spaced apart by two sets of overlapped separate cross-member parts consisting of upper cross-member second part 30S and upper cross-member first part 30F, and by overlapped separate lower cross-member second part 40S and lower cross-member first part 40F.

Upper cross-member second part 30S has an attached sleeve 32, which is also formed from open sections of pipe, but here sized to slideably fit over the upper the free distal end of cross-member first part 30F. Sleeve 32 is attached aligned, and positioned at the free distal end of upper cross-member second part 30S.

Lower cross-member second part 40S also has an attached cross-member sleeve 42, also formed from open sections of pipe, sized to slideably fit over first cross-member 40F. Sleeve 42 is attached with aligned and enclosing the distal free end of lower cross-member first part 40F.

Upper cross-member first part 30F has an attached cross-member sleeve 31, which is also formed from open sections of pipe, sized to slideably fit over upper cross-member second part 30S. Cross-member sleeve 31 is attached aligned and positioned such as to enclose the distal free end of upper cross-member second part 30S.

Lower cross-member first part 40F also has an attached cross-member sleeve 41, also formed from open sections of pipe, sized to slideably fit over lower cross-member second part 40S. Sleeve 41 is attached aligned and positioned such as to enclose the distal free end of lower cross-member second part 40S.

A nut 34 is attached to cross-member sleeve 31, bolt 36 mates with said nut. A hole through sleeve 31, not shown, is the same size as and aligned with the hole through nut 34. This allows the end of bolt 36 to extend into sleeve 31 to secure the enclosed upper cross-member second part 30S. Likewise, a nut 44 is attached to cross-member sleeve 41, bolt 46 mates with said nut. A hole through sleeve 41, not shown, is the same size as and aligned with the hole through nut 44. This allows the end of bolt 46 to extend into sleeve 41 to secure the enclosed lower cross-member second part 40S.

As illustrated, with this arrangement the cross-member sleeves for both cross-members enclose the opposite cross-member. The spacing between legs 11 can be adjusted, first by using a wrench to turn bolts 36 and 46 until the bolts are withdrawn from sleeves 31 and 41 respectively which respectively frees upper cross-members second part 30S and lower cross-member second part 40S. The spacing between legs 11 can then be adjusted and bolts 36 and 46 then retightened until cross-member parts 30S and 40S respectively are resecured.

Again, if desired, extensions 8 of FIG. 1 can also be used for height adjustment in the same manner as described for this figure by sizing sleeves 12 to slideably fit over legs 11.

Figure 4:
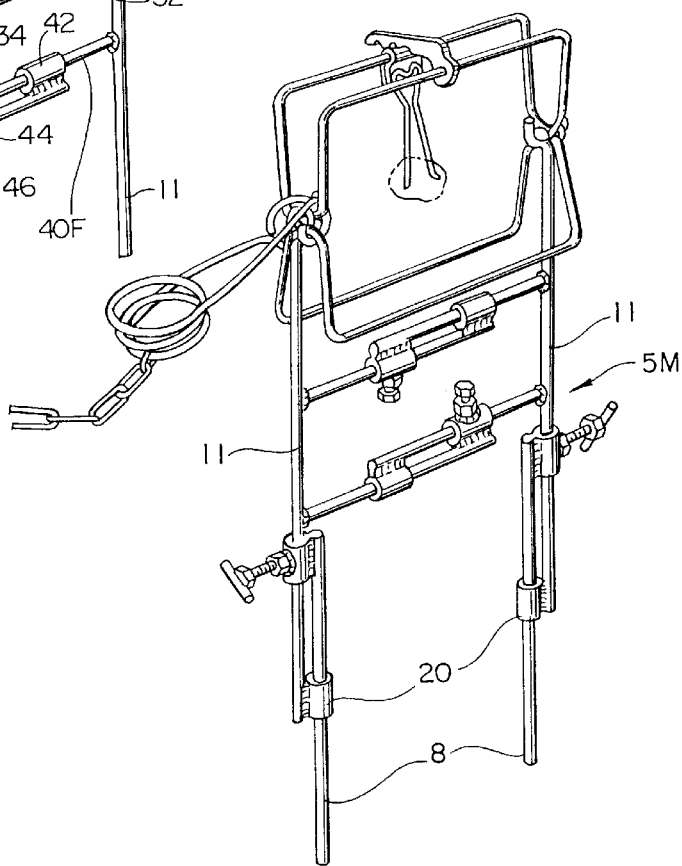
FIG. 4 shows extensions mounted upon a modified trap stand providing additional support to the extensions, and also modified to permit adjusting the leg spacing.

FIG. 4 shows a stand 5m which has been modified to support extensions 8 the same as stand 3 of FIG. 2, which also has overlapping cross-members to provide an adjustable distance between legs 11 the same as between legs 11 of stand 5 of FIG. 3.

The modifications of stand 5m again provides legs 11 with attached leg sleeves 20, made of pipe sized to slideably fit over extensions 8. Sleeves 20 are attached aligned and overlapping the distal free ends of legs 11 on the side opposite respective extensions 8 as before. Note however that sleeves 20 could also be omitted here and extensions 8 would operate the same as in FIG. 1 for height adjustment.

All parts of extensions 8 are arranged the same manner as in FIG. 2, all parts are numbered the same and all operate in the same manner.

With the leg extension arrangement, as shown in FIG. 4, extensions 8 can again be adjusted with respect to legs 11 using the same simple means, as was described above with respect to legs 7 for FIG. 2.

In FIG. 4 stand 5M can also be adjusted in width for different size traps 1 in the same manner as stand 5M of FIG. 3. All elements required for width adjustment are the same, are numbered the same and operate in the same manner.

Again, with this arrangement, when the apparatus is assembled as illustrated in the FIG. 4, the spacing between legs 11 can be adjusted in the same manner as legs 11 of FIG. 3. This procedure again provides easy and simple means for changing the width of stand 5m to receive a number of different size traps.

These improvements permit adjusting the height of existing trap stands by easy to adjust extensions. In addition, improvements to the stands provide additional support for extensions using sleeves attached to the stand legs and/or means for adjusting the width of stands to accommodate various size traps. All of the improvements are easy to use and adjust in the field for maximum utility.

While this invention has been described with reference to illustrative embodiments, these descriptions are not intended to be construed in a limiting sense. Various modifications of the illustrative embodiments, as well as other embodiments of the invention, will be apparent to persons skilled in the art upon reference to these descriptions. It is therefore contemplated that the appended claims will cover any such modifications or embodiments as fall within the true scope of the invention.

What is claimed is:

1. A trap stand for engaging and supporting a body trap, said stand comprising
    a pair of supporting elements spaced apart by at least one adjustable cross-member, said cross member comprising a separate overlapped opposed first and second parts attached to and extending outwardly from each supporting element;
    a means for engaging the trap located at a distal end of each said element;
    an adjustable securing means for securing said opposed first and second parts together and for adjusting the distance between the supporting elements; and,
    wherein the adjustable securing means is used to vary a distance between the means for engaging to securely engage traps of varying width and size.

2. The improvement of claim 1 further comprising each said opposed first and second parts having first sleeves attached adjacent free ends thereof; said first sleeves being sized, attached and arranged to slideably enclose the opposed cross-member; said securing means comprising nuts having threaded holes therethrough, said nuts being attached only to those first sleeves which are attached to said first parts, said nuts being attached to the sides of said first sleeves which are generally opposite to said first parts, said nuts being attached with the threaded holes through said nuts being oriented perpendicular to said first sleeves, said securing means further comprising only said first sleeves which have an attached nut, said securing means further comprising bolts sized and threaded to mate with each said threaded hole through said nut.

\* \* \* \* \*